No. 677,146. Patented June 25, 1901.
W. C. THURMAN.
PORTABLE FORGE.
(Application filed Oct. 30, 1900.)
(No Model.)

Witnesses,

Inventor,
William C. Thurman
By Dewey Strong & Co.
Attys

UNITED STATES PATENT OFFICE.

WILLIAM CORNELIUS THURMAN, OF SANGER, CALIFORNIA.

PORTABLE FORGE.

SPECIFICATION forming part of Letters Patent No. 677,146, dated June 25, 1901.

Application filed October 30, 1900. Serial No. 34,882. (No model.)

*To all whom it may concern:*

Be it known that I, WILLIAM CORNELIUS THURMAN, a citizen of the United States, residing at Sanger, county of Fresno, State of California, have invented an Improvement in Portable Forges; and I hereby declare the following to be a full, clear, and exact description of the same.

My invention relates to improvements in portable forges.

It consists of a blower and connections, a transversely-channeled hearth having multiple twyers and air-passages leading thereto, means for regulating the blasts, and of details more fully to be set forth in the following specification and accompanying drawings, in which—

Figure 1:
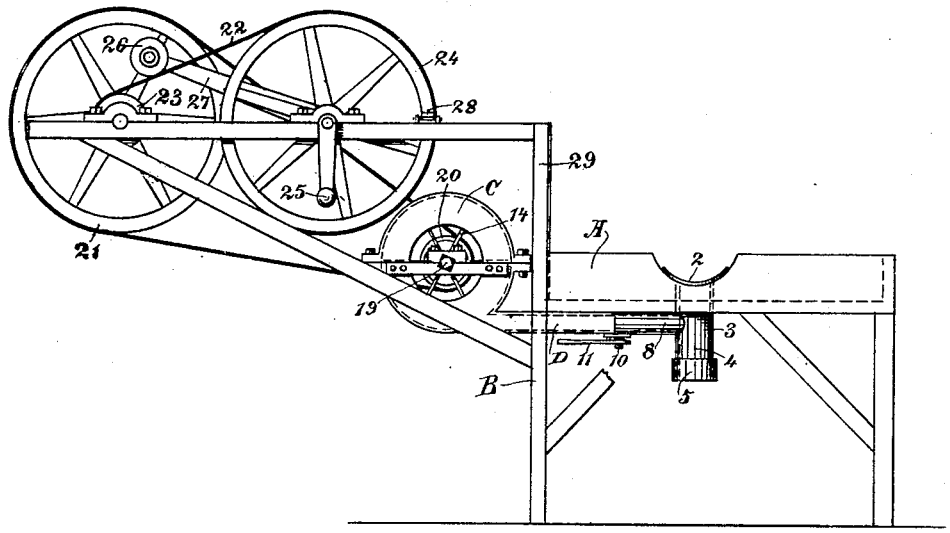
Figure 2:
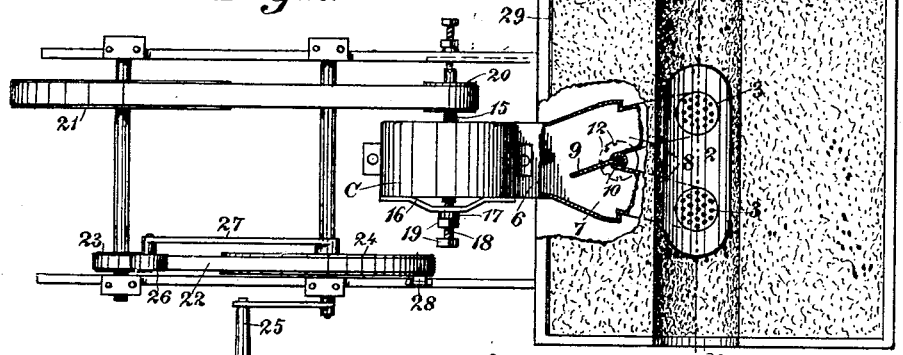
Figure 3:
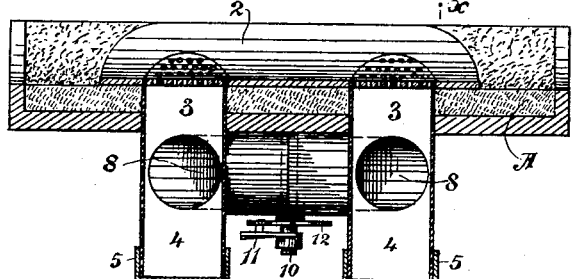

Figure 1 is a side elevation of the forge. Fig. 2 is a plan view. Fig. 3 is a lateral section on line $xx$ of Fig. 2.

A represents a hearth made fireproof by a filling of clay, brick, or other suitable substance supported upon a frame, as B.

2 is a transverse hearth-plate or fire-pit having therein the twyers 3. Below these twyers are the chambers or ash-receptacles 4, which are closed at their lower end by caps 5. For those caps there may be substituted a variety of closing means, as a hinged door, a slide-valve, a screw-cap, &c. The ashes and cinders accumulating in the chambers 4 are removed by withdrawing these caps.

Connecting the fan-blower C with the chambers 4 is the air-passage D, having the main pipe 6 and the flared end 7, from which diverge the branches 8. A wing-valve 9 is pivoted within 6 and between the branches 8 in such manner that air may pass into all of the branches, or it may close the opening of one of these and permit the air to pass only into the other. The pivot-pin 10 of this valve extends through the case or pipe 6, and terminates in a handle 11, by which the position of the valve is changed. Notches 12 are formed on a projection on the pipe in which the handle is held. By the position of the handle the quantity of air to the twyers is regulated so that one or both may be used, or one used with a reduced volume when it is desired to have the fires of varying intensity.

The blower C and its driving parts are suitably mounted on an extension of the frame B. C has a casing whose upper portion is hinged or otherwise secured to the lower portion and permits inspection of the fans 14 when necessary. These fans are made fast upon the shaft 15 by roughing the axle and molding a "babbitt" hub with the fan-arms in place on the shaft. The mounting of the shaft 15 of this blower is of great importance in my invention.

16 represents journal-braces upon the casing, having at the elbow the reinforcing-bosses 17, through which are threaded perforations receiving the threaded pivoted bolts 18. The shaft 15 has its ends countersunk and is journaled upon the points of these bolts. When properly adjusted, the bolts are locked by set devices, as nuts 19. I thus secure practically an antifrictional bearing for my blower-shaft, thereby increasing the speed of the fans and the force of the blast. This shaft is driven by gearing as follows: A pulley 20, secured upon the shaft, carries a belt, which passes over the wheel 21. A belt 22 passes over a pulley 23 upon the shaft of 21 and around the wheel 24, which is driven by a hand-crank 25, or other suitable power may be used.

That the belt 22 may always be kept taut I provide a "rider" or weight-pulley 26 upon a pivoted arm 27. A stop or pawl 28 is hinged upon the frame and rests by its own weight against the rim of the driving-wheel 24 and prevents the turning of the wheel in the reverse direction. A guard 29 protects the driving parts from the heat of the fire.

The features that I wish to emphasize most particularly in my invention are the divided air-inlet and the transverse fire-pit. The latter, which is open at the ends, by extending completely across the forge saves the necessity of using so much coal to get sufficient depth to the fire, and enables one in a small forge to heat and weld large bars, axles, &c., where a considerable longitudinal surface has to be subjected to the fire. This is accomplished directly through the use of the twyers and their air-passages, arranged as shown. While I have only illustrated two such openings, and as that is sufficient under ordinary circumstances, I do not wish to limit myself to that exact arrangement, for it is readily seen that more, if desired, could be placed in the fire-pit and still retain the principle shown. By the use of the twyers so arranged I am able to have a large or a small fire, according as I set the wing-valve 9, and may vary the intensity of the fire above the individual twyers.

Having thus described my invention, what I claim as new, and desire to secure by Letters Patent, is—

1. A portable forge including a hearth having a transverse fire-pit extending completely across the hearth and open at the ends, a main air-passage, passages branching from said main passage and having twyers entering the pit, and a controlling device substantially at the junction of the branch passages with the main air-passage for regulating the blast in the branch passages.

2. A portable forge consisting of a hearth having a fire-pit or hearth-plate, extending the entire width of the hearth and open at the ends, a plurality of twyers in the hearth-plate, chambers below and connected with these twyers, separate air-passages connecting each of these chambers with the main blast-pipe of the blower, and a valve common to each of the separate passages for regulating the supply of air to each of these air-passages and respective twyers.

3. A portable forge consisting of a hearth having a transverse hearth-plate, two twyers entering the bottom of the plate having lower chamber extensions, means for closing the end of each chamber, each chamber having a separate air-inlet and connection with the main blast-pipe of the blower, a wing-valve pivoted within the blast-pipe and between the air-inlet pipes, and means for operating this valve so that the blast may be directed into either one or both of the inlet-pipes.

4. A portable forge consisting of a hearth having a transversely-channeled fire-pit, a plurality of twyers entering therein, a tubular extension or chamber below each of these twyers, a removable closure for the lower end of each extension, an air-inlet to each of these chambers, said inlets opening into the end of the main blast-pipe of the blower, a wing-valve pivoted within the main pipe and between the said inlet-pipes, an arm extension on this valve extending through the inclosing pipe by which the valve may be made to close one or the other of the inlets, or to allow the blast to pass through both inlets, and means for holding this arm extension in position.

5. A portable forge including a hearth having a transversely-channeled fire-pit, a plurality of twyers entering the pit from below and having ash-receiving chambers with removable closures, separate air-passages connecting with the twyers and a main air-passage connecting with the separate passages, means for regulating the passage of air through the separate passages, a blower and a casing therefor, and means for operating the blower.

In witness whereof I have hereunto set my hand.

WILLIAM CORNELIUS THURMAN.

Witnesses:
  WM. J. YOUNGER,
  HATTIE MEAD.